United States Patent [19]

Hill

[11] Patent Number: 4,980,209

[45] Date of Patent: Dec. 25, 1990

[54] WRAP FOR A FLOWER POT

[75] Inventor: Reinier Hill, Hamilton, Canada

[73] Assignee: AEC Machinery Limited, Hamilton, Canada

[21] Appl. No.: 348,959

[22] Filed: May 9, 1989

[51] Int. Cl.⁵ .............................. B29D 22/00
[52] U.S. Cl. ................. 428;34.1; 428/36.92; 428/35.7; 47/66
[58] Field of Search ............... 47/66, 72, 84; 428/34.1, 36.92, 35.7, 35.5; 206/423; 229/87 P, 4.5; 150/154; 220/73, 903

[56] References Cited

U.S. PATENT DOCUMENTS

| | | | |
|---|---|---|---|
| D. 161,026 | 11/1950 | Hollander | 47/66 |
| 1,794,212 | 2/1931 | Snyder | 47/72 |
| 2,171,835 | 9/1939 | Mackie | 47/72 |
| 2,845,735 | 8/1958 | Werner | 47/72 |
| 4,216,620 | 8/1980 | Weder et al. | 47/72 |
| 4,300,312 | 11/1981 | Weder et al. | 47/72 |
| 4,393,910 | 7/1983 | Rasmussen | 428/34.1 |
| 4,733,521 | 3/1988 | Weder et al. | 53/580 |
| 4,773,182 | 9/1988 | Weder et al. | 428/36.92 |
| 4,835,834 | 6/1989 | Weder | 29/525 |

Primary Examiner—Marion C. McCamish
Assistant Examiner—J. Weddington
Attorney, Agent, or Firm—Jeffers, Hoffman & Niewyk

[57] ABSTRACT

A wrap for a flower pot comprises a sheet of material formed into the shape of a flower pot and having a pair of matching rings trapping the material between them at a location which, in use, will be adjacent to the upper margins of a flower pot. There is also disclosed a method of forming a flower pot wrap in which a first ring is placed on a mandrel having the shape of a flower pot, a sheet of material is placed over the mandrel and a second ring is moved over the sheet about the mandrel to engage the first ring and trap the sheet between the two rings.

9 Claims, 4 Drawing Sheets

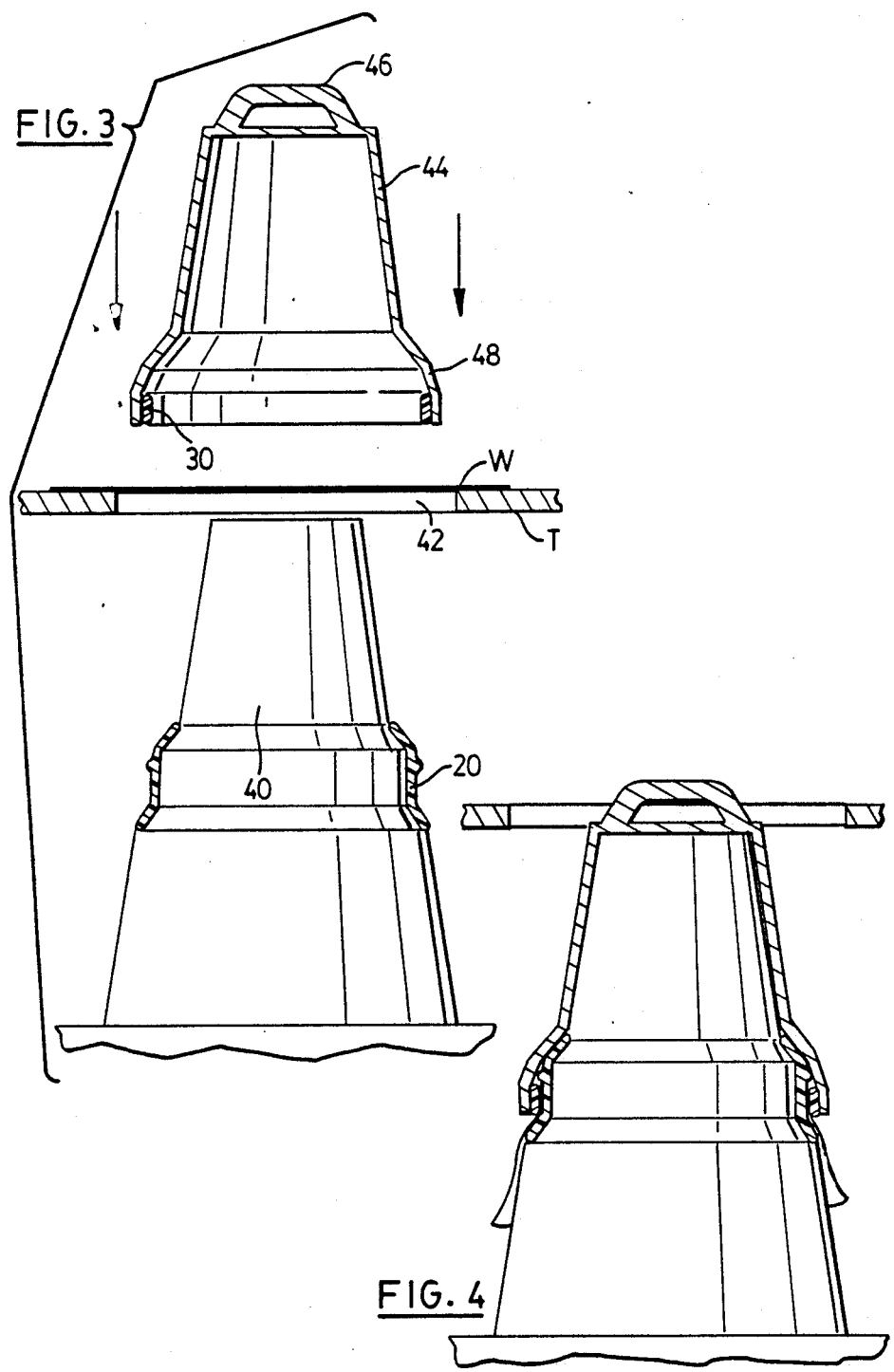

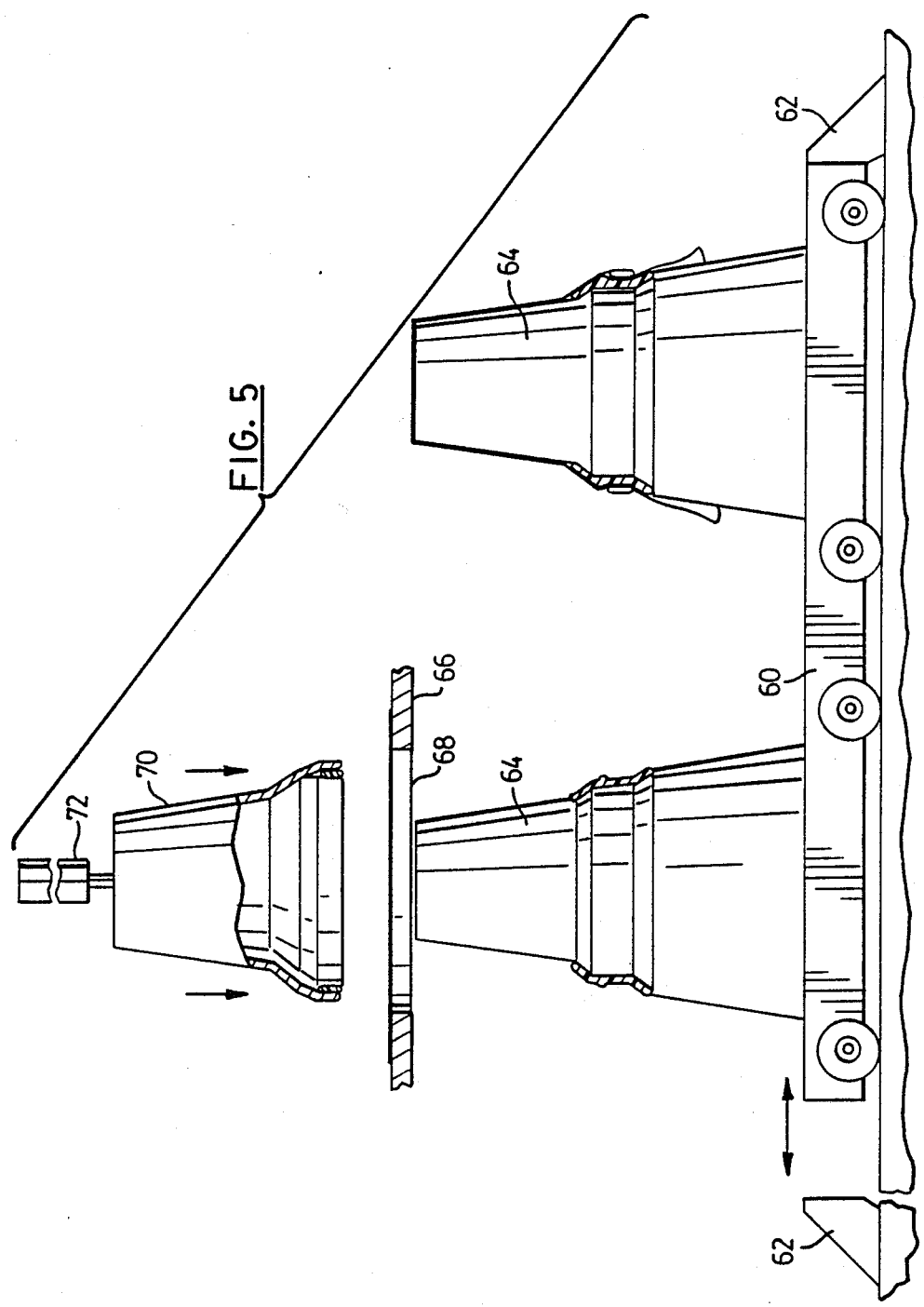

WRAP FOR A FLOWER POT

The present invention relates to a wrap for a flower pot; to a method of making such a wrap and to apparatus for making the wrap.

A well known flower pot wrap comprises a sheet of foil of which the inner and outer surfaces are coated with an adhesive. The sheet is wrapped about a flower pot shaped mandrel and heated so that the overlapped portions of the sheet adhere and the sheet assumes the flower pot shape of the mandrel. When the shaped sheet is removed from the mandrel, it is self supporting and ready to receive a pot.

This arrangement is limiting in terms of the appearance of the wrap because of the nature of the sheet and the coating applied to it. The present invention seeks to provide a flower pot wrap which may be formed of any sheet material capable of being self supporting and which need not be coated.

Accordingly, there is provided a flower pot wrap comprising a sheet of material formed into the shape of a flower pot and having a pair of matching rings trapping the material between them at a location which, in use, will be adjacent the upper margins of a flower pot.

In one embodiment, one of the pair of rings may be formed integrally with the flower pot. If that one of the rings is the outer ring, then a separate inner ring would tuck the marginal edges of the sheet into the interior of the mouth of the flower pot. If it be the inner ring, then the outer ring would be separable and the marginal edges of the sheet would rise above the mouth of the pot.

According to another aspect of the present invention, there is provided a method of forming a flower pot wrap which comprises placing a first ring on a mandrel having the shape of a flower pot, placing a sheet of material over the mandrel and moving a second ring over the sheet about the mandrel to engage the first ring and trap the sheet between the two rings.

Preferred embodiments of the invention are illustrated in the accompanying drawings in which:

FIG. 3 shows a simple device for forming the wrap of FIGS. 1 and 2;

FIG. 4 shows the position of the components of FIG. 3 as the wrap is formed;

FIG. 5 is a partially automated device for forming the wrap of FIGS. 1 and 2.

Figure 2:
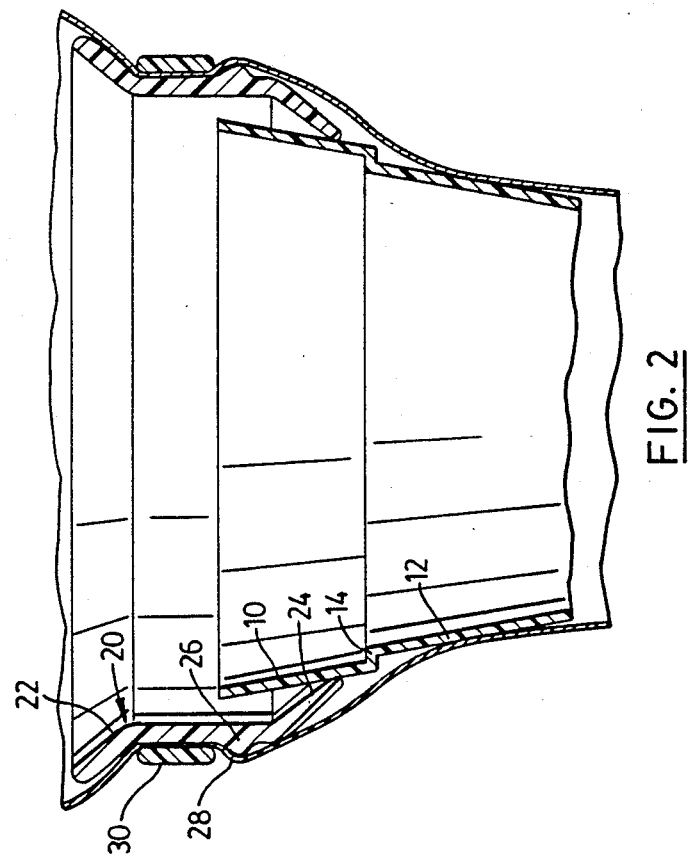
FIG. 2 is a cross sectional view of a detail of the pot and wrap of FIG. 1.
Figure 1:
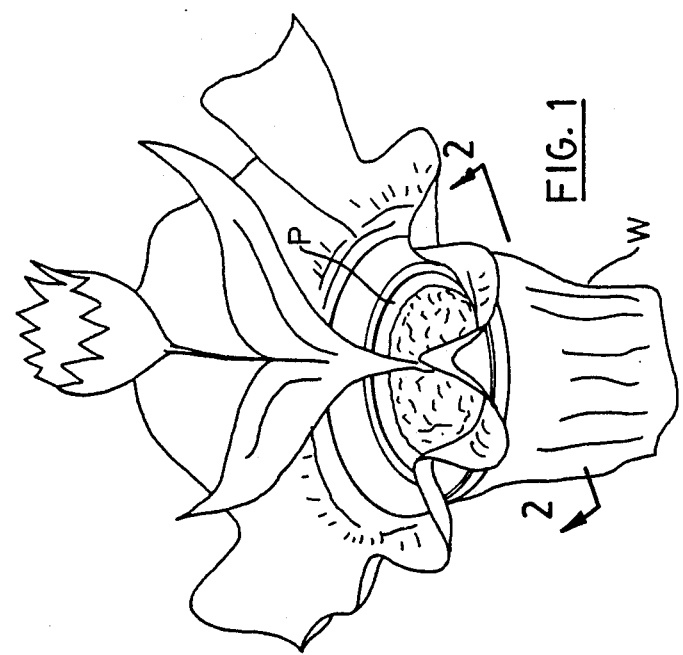
FIG. 1 shows a flower pot within a flower pot wrap according to this invention.

FIG. 1 illustrates a flower pot P with a wrap W about it. The structure is more clearly visible in FIG. 2 which is a detail of the upper edge of the pot and the wrap. The pot is an entirely conventional form having a collar portion 10 joined to the main body 12 by a shoulder 14. An inner ring 20 of generally lazy S cross section having an outwardly flared upper portion 22 and an inwardly tapering lower section 24 joined by a mid region 26 is provided. An annular bead 28 projects from the mid portion 26 at a location spaced from the union of portions 22 and 26 by a distance slightly greater than the length of a second ring 30.

The second ring has an inner diameter somewhat less than the diameter of the bead 28 so that it may be snapped over that bead to lie in the space between the upper edge of the bead and the outwardly flared portion 22.

The diameter of the lowermost end of the inwardly tapered portion 24 is selected to be somewhat less than the upper diameter of the collar of the flower pot so that it can resiliently grip the outer surface of the collar.

A simple device for forming a flower pot cover according to this invention is illustrated in FIGS. 3 and 4. It comprises a male mandrel 40 supported beneath a table T upon which a sheet to form the wrap is lain to extend across an opening 42 provided in the table. A simple pot shaped device 44 is provided with a handle 46 and an annular recess 48 at its lower inner edge.

In use, an inner ring 20 is placed about the mandrel 40 and an outer ring 30 is disposed within the recess 48. Thereafter, the pot shaped element 44 is passed through the opening 42 provided in the table carrying the wrap with it and moved down until the ring 30 engages mid region 26 of ring 20 trapping the material of the wrap between the two rings. This situation is illustrated in FIG. 4.

An alternative arrangement for forming wraps according to this invention is illustrated in FIG. 5. In that figure, a wheeled truck 60 is movable between a pair of end-stops 62 and carries a pair of male mandrels 64. Above the truck is a table 66 with an opening 68 across which a sheet to form a wrap is lain. The left hand one of the mandrels as viewed in FIG. 5 is in the position to form a wrap.

Above the opening in the table 68, is a female pot shaped device 70 carried by an air cylinder 72. Actuation of the cylinder causes the sheet to be carried forward with the element 70 through the opening 68 and on to the mandrel 64. A ring carried in element 70 will be snapped onto a ring placed upon mandrel 64. Once the cylinder is retracted, the truck 60 is moved to the left hand stop 62 which brings mandrel 64 to beneath the cylinder. The operation is repeated.

Figure 6:
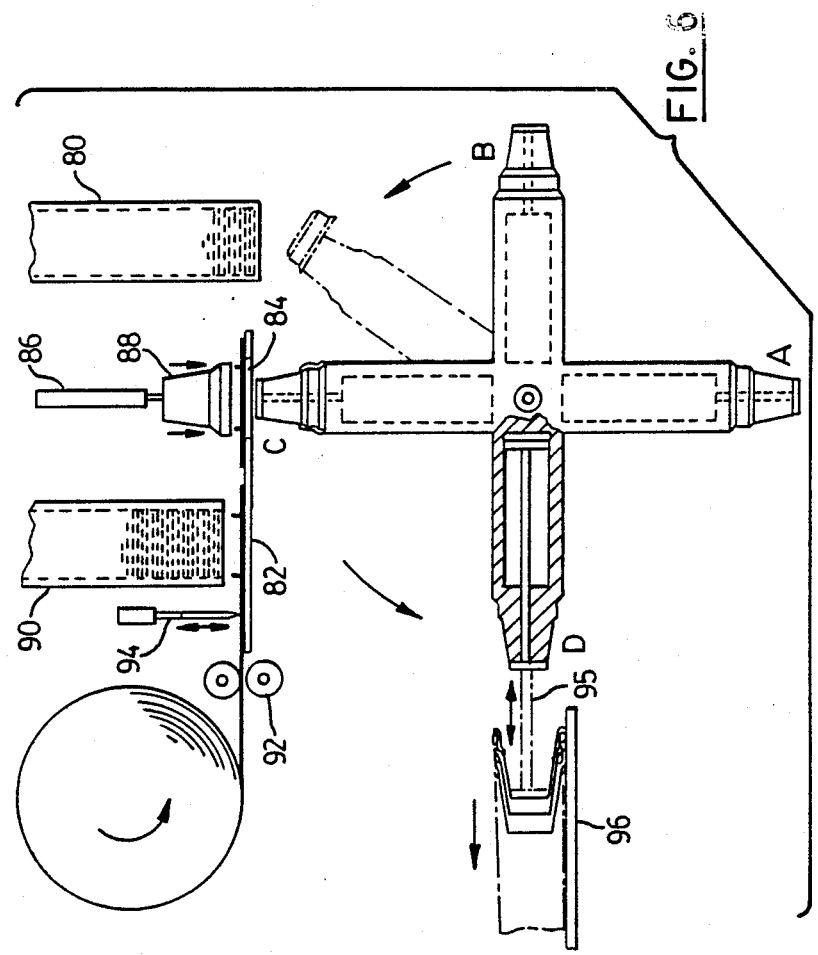
FIG. 6 is an alternative apparatus for forming the wrap of FIGS. 1 and 2.

A further embodiment of equipment to form the wraps according to this invention is illustrated in FIG. 6. In that Figure, a four armed capstan has mandrels at positions A, B, C and D. As the mandrel is indexed in a counter-clockwise direction, the mandrel at B picks up an inner ring from a magazine 80 and carries it to a wrap forming location at C. Above the location C is a table 82 with an opening 84 provided therein. An 86 carrying a female flower pot shaped element 88 is disposed above the opening to cause the element 88 to pass through the opening and engage with the mandrel. A magazine 90 of outer rings is disposed above the table and has an appropriate pusher element (not shown) to move an outer ring to beneath the element 88.

A roll of wrap material is disposed to the left of the magazine 90 and a portion of the material is driven by drive rolls 92 to a position above the opening 84 in the table 82 and below the element 88. An appropriate length of the material is severed by a knife at 94.

With the mandrel at station C, and with an inner ring disposed on it, the cylinder 86 is actuated so that it carries an outer ring through the opening together with the severed sheet of wrap material to cause the outer ring to be snapped over the inner ring. Thereafter the cylinder is withdrawn, the capstan is indexed to position D and a cylinder indicated schematically at 95 is actuated to displace the formed wrap from the mandrel to be accumulated at table 96.

We claim:

1. In combination, a flower pot wrap and a flower pot having an upper margin, said flower pot having a first ring integrally formed therewith adjacent said upper margin, said flower pot wrap comprising a sheet of material formed into the shape of a flower pot and a second ring matched with said first ring and trapping said material therebetween, one of said rings having a surface shaped to retain the other of said rings thereagainst.

2. The combination of claim 1 wherein said first ring has an outer surface shaped to provide said retaining means.

3. The combination of claim 2 wherein said retaining means includes an annular bead extending continuously around said outer surface, said second ring having an inner diameter less than the diameter of said annular bead.

4. The combination of claim 3 wherein said retaining means further comprises an outwardly flared portion spaced from said annular bead, said first ring including a mid region extending between said annular bead and said outwardly flared portion, said mig region being dimensioned to received said second ring.

5. In combination, a flower pot wrap and a flower pot, wherein said wrap comprises a sheet of self-supporting material formed into the shape of the flower pot and having inner and outer matching rings, said inner ring having an inner surface for surrounding the flower pot, one of said rings having a surface shaped to provide retaining means for retaining the other of said rings thereagainst, said inner and outer rings trapping said material therebetween at a location which, in use, will be adjacent the upper margins of the flower pot.

6. The combination of claim 5 wherein said inner ring has an outer surface shaped to provide said retaining means.

7. A flower pot wrap as defined in claim 6 wherein said retaining means includes an annular bead extending continuously around said outer surface, said outer ring having an inner diameter less than the diameter of said annular bead.

8. A flower pot wrap as defined in claim 7 wherein said retaining means further comprises an outwardly flared portion spaced from said annular bead, said inner ring including a mid region extending between said annular bead and said outwardly flared portion, said mid region being dimensioned to receive said outer ring.

9. The combination of claim 8 wherein said inner ring further includes an inwardly flared portion extending from said mid region adjacent said bead, said inwardly flared portion for resiliently gripping said flower pot when in use.

* * * * *